United States Patent
Liu et al.

(10) Patent No.: US 9,491,225 B2
(45) Date of Patent: Nov. 8, 2016

(54) OFFLINE DOWNLOAD METHOD AND SYSTEM

(71) Applicant: Tencent Technology (Shenzhen) Company Limited, Shenzhen (Guangdong) (CN)

(72) Inventors: Gang Liu, Shenzhen (CN); Yunsheng Wu, Shenzhen (CN)

(73) Assignee: TENCENT TECHNOLOGY (SHENZHEN) COMPANY LIMITED, Shenzhen (Guangdong) (CN)

( * ) Notice: Subject to any disclaimer, the term of this patent is extended or adjusted under 35 U.S.C. 154(b) by 529 days.

(21) Appl. No.: 14/236,070

(22) PCT Filed: Mar. 15, 2013

(86) PCT No.: PCT/CN2013/072738
§ 371 (c)(1),
(2) Date: Jan. 29, 2014

(87) PCT Pub. No.: WO2013/135203
PCT Pub. Date: Sep. 19, 2013

(65) Prior Publication Data
US 2014/0195643 A1     Jul. 10, 2014

(30) Foreign Application Priority Data

Mar. 16, 2012   (CN) .......................... 2012 1 0070620
May 16, 2012   (CN) .......................... 2012 1 0151239

(51) Int. Cl.
G06F 15/16     (2006.01)
H04L 29/08     (2006.01)
(Continued)

(52) U.S. Cl.
CPC .......... *H04L 67/06* (2013.01); *H04N 21/2181* (2013.01); *H04N 21/2393* (2013.01); *H04N 21/23109* (2013.01); *H04N 21/23418* (2013.01)

(58) Field of Classification Search
CPC ............... H04L 67/06; H04L 21/2181; H04L 21/23109; H04L 21/23418; H04L 21/2393
See application file for complete search history.

(56) References Cited

U.S. PATENT DOCUMENTS 6,473,756 B1 * 10/2002 Ballard ............. G06F 17/30106
8,024,396 B2     9/2011 Sedukhin et al.
(Continued)

FOREIGN PATENT DOCUMENTS

CN         101166190 A        4/2008
CN         101184091 A        5/2008
(Continued)

OTHER PUBLICATIONS

Later publication of revised version of International Search Report (A9 36/2014) issued in PCT/CN2013/074647, mailed Apr. 9, 2014, 5 pages.
(Continued)

*Primary Examiner* — Jonathan Bui
(74) *Attorney, Agent, or Firm* — Faegre Baker Daniels LLP (57) ABSTRACT

An offline download method used with an offline download system is developed. The offline download system pre-downloads a requested file and stores the requested file in a cloud storage in response to an offline download request from a client. The offline download method includes steps of calculating similarity values between any two files stored in the cloud storage; grouping files with the similarity values greater than a threshold value; sorting the grouped files according to the similarity values. Thus, at least one file stored in the cloud storage can be deleted or suggested to substitute the requested file according to the sorting result.

20 Claims, 6 Drawing Sheets

(51) Int. Cl.
*H04N 21/218* (2011.01)
*H04N 21/231* (2011.01)
*H04N 21/234* (2011.01)
*H04N 21/239* (2011.01)

(56) References Cited

U.S. PATENT DOCUMENTS

| | | | |
|---|---|---|---|
| 8,112,412 B1* | 2/2012 | Nachenberg | G06F 21/51 |
| | | | 707/710 |
| 8,495,735 B1* | 7/2013 | Warner | H04L 51/12 |
| | | | 705/50 |
| 8,752,092 B2 | 6/2014 | Weeks | |
| 2003/0208540 A1 | 11/2003 | Kawahara et al. | |
| 2003/0217171 A1 | 11/2003 | Von Stuermer et al. | |
| 2003/0225796 A1 | 12/2003 | Matsubara | |
| 2004/0122909 A1 | 6/2004 | Saika | |
| 2007/0089110 A1* | 4/2007 | Li | H04L 67/2847 |
| | | | 717/178 |
| 2007/0204057 A1 | 8/2007 | Shaver et al. | |
| 2007/0237133 A1 | 10/2007 | Woods et al. | |
| 2009/0288127 A1 | 11/2009 | Corson et al. | |
| 2009/0298582 A1 | 12/2009 | Dempsky et al. | |
| 2009/0300204 A1 | 12/2009 | Zhang et al. | |
| 2010/0142447 A1 | 6/2010 | Schlicht et al. | |
| 2010/0199312 A1 | 8/2010 | Chang et al. | |
| 2011/0169913 A1 | 7/2011 | Karaoguz et al. | |
| 2013/0018990 A1* | 1/2013 | Cai | H04L 67/06 |
| | | | 709/219 |
| 2013/0132521 A1* | 5/2013 | Fonseca, Jr. | H04N 21/41407 |
| | | | 709/219 |
| 2013/0166391 A1* | 6/2013 | Blow | H04L 67/06 |
| | | | 705/14.66 |
| 2013/0167137 A1 | 6/2013 | Bansod et al. | |
| 2014/0156810 A1 | 6/2014 | Liu et al. | |
| 2014/0165119 A1 | 6/2014 | Liu et al. | |

FOREIGN PATENT DOCUMENTS

| | | |
|---|---|---|
| CN | 101945278 A | 1/2011 |
| CN | 101977228 A | 2/2011 |
| CN | 102055964 A | 5/2011 |
| CN | 102118406 A | 7/2011 |
| CN | 101674261 B | 9/2011 |
| CN | 102387220 A | 3/2012 |
| CN | 102447688 A | 5/2012 |
| FR | 2918241 A1 | 1/2009 |
| JP | 2009093212 A | 4/2009 |
| KR | 2002009785 A | 2/2002 |
| KR | 1020090055903 A | 6/2009 |

OTHER PUBLICATIONS

International Search Report issued in PCT/CN2013/072738, mailed Jun. 27, 2013, 3 pages.
International Search Report issued in PCT/CN2013/074647, mailed Aug. 1, 2013, 5 pages.
International Search Report issued in PCT/CN2013/075280, mailed Aug. 15, 2013, 4 pages.
Written Opinion issued in PCT/CN2013/075280, mailed Aug. 15, 2013, 5 pages.

* cited by examiner

OFFLINE DOWNLOAD METHOD AND SYSTEM

CROSS-REFERENCE TO RELATED APPLICATIONS

This application is a national phase application of PCT Application No. PCT/CN2013/072738, internationally filed Mar. 15, 2013, which claims priority to Chinese Patent Application 201210070620.3, filed Mar. 16, 2012, and Chinese Patent Application 201210151239.X, filed May 16, 2012, the disclosures of which are incorporated herein by reference.

TECHNICAL FIELD

The present disclosure relates to an offline download method and an offline download system, and more particularly to a method and a system for offline downloading video files.

BACKGROUND

Typically, in a file-sharing system, files are downloaded from a single server to a client and the most effective way to accelerate downloading is to allow data to be transmitted at full rate which is restricted by the bandwidth between the server and the client. Peer-to-peer (P2P) distributed technologies, for example BitTorrent, eMule, and the like, have been developed to allow shared access to various sources. In other words, data are transmitted among different peers at the same time. The download speed is significantly affected by the popularity of the downloaded file. Popular files can be downloaded in an effective manner, but files with lower popularity are usually downloaded at a slower speed. Moreover, the number of peers available changes, which usually slows down the download and sometimes results in no progress for a long time due to lack of available peers.

SUMMARY

The present disclosure provides an offline download method used with an offline download system. At first, the offline download system receives an offline download request for a requested file from the client. If the requested file is not found in a cloud storage of the offline download system, at least one substitute file is selected from the files stored in the cloud storage. The substitute file is determined by the similarity between the requested file and the substitute file. The similarity is calculated based on the filename or the file content. The client can decide whether to download the substitute file from the cloud storage without waiting for the pre-download process of the requested file.

The present disclosure further provides an offline download system for pre-downloading a requested video file from the internet in response to an offline download request from a client. The offline download system includes cloud storage, a similarity-calculating device, a video matching database, and a task manager. The similarity-calculating device calculates similarity values between any two video files stored in the cloud storage. The video matching database groups video files with the similarity values greater than a threshold value and sorts the grouped video files according to the similarity values in descending order. The task manager receives the offline download request, and suggests at least one substitute file selected from the video files stored in the cloud storage if the requested video file is not stored in the cloud storage. The substitute file is determined to be similar to the requested video file according to the similarity value between the substitute file and the requested video file.

The present disclosure further provides an offline download system for pre-downloading a requested file from the internet in response to an offline download request from a client. The offline download system includes cloud storage, a task manager, a cluster database and a cluster-analyzing device. The task manager receives the offline download request from the client, and extracts a filename of the requested file from the offline download request. The cluster-analyzing device searches the extracted filename in the cluster database. If the extracted filename is not recorded in the cluster database, the task manger suggests at least one substitute file whose filename is similar to the extracted filename from the cloud storage.

DETAILED DESCRIPTION

The present invention will now be described more specifically with reference to the following embodiments. It is to be noted that the following descriptions of embodiments are presented herein for purposes of illustration and description only. It is not intended to be exhaustive or to be limited to the precise form disclosed.

Cloud pre-download technology is an offline download method that reduces peer availability issues. In cloud pre-download technology, a desired file is pre-downloaded to a server of the service provider (offline download server) in response to a request of the client. After the pre-download process completes, the entire pre-downloaded file is transmitted to the client's local computer at high speed when the local computer is connected to the offline download server. Therefore, it is not necessary for the local computer to be connected to the file source all day long so that the bandwidth of the local computer is available for other actions or applications. According to the offline download method, if the desired file is out of popularity and the source peers for the desired file are few, which provides a slower download speed, the client can request the offline download server to pre-download the desired file rather than directly download the file from the poor source peers to the local computer. Downloading the file from the offline download server is more effective than downloading the file directly from the original file source.

The offline download method has several advantages such as rapid, stable, and unrestricted downloading. The offline download server is coupled to a network system with greater bandwidth than the network system coupled to a client computer, such as asymmetric digital subscriber line (ADSL) network. Hence, the download speed for files from/to the offline download server is much higher than the download speed for the files from the file source to the client computer. The total time required for the offline download server to receive a file from the file source and then transmit the file to the client computer is less than the time required for direct transmission between the file source and the client computer. Further, since the download speed to the client computer is limited by the available bandwidth, but not a constant bandwidth as announced by the network service provider, the download speed fluctuates depending on the network environment. On the contrary, the bandwidth between the offline download server and the client computer is great enough to stabilize the download speed. Moreover, the offline download server works 24 hours a day and 7 days a week at full rate. Even though the download speed is restricted by the BitTorrent, eMule, or other P2P distributed services, the computer does not have to be tied up for the download action for a long time. The client only has to issue a request, and then download the files from the offline download server at high speed after the pre-download process completes. The offline download technology overcomes previous download restrictions, saves time, and is cost-effective.

In this specification, "pre-download process" is defined as data transmission from the file sources to the offline download sever, while "download process" is defined as data transmission from the offline download server to the client computer. These definitions are not intended to limit the transmission mechanism. To start the offline download process, an offline download request is sent to a task manager of the offline download server. The offline download request includes a uniform source locator (URL) link, a hypertext transfer protocol (HTTP) request link, an eMule identifier, a torrent file, or a Magnet link to indicate the desired file. Upon receiving the offline download request, the task manager searches a hash value corresponding to the file indication in a task database. For example, if the offline download request includes a URL link, the hash value is obtained from a hash function of the URL link. If the offline download request includes an eMule identifier, the hash value may be a MD4 or MD5 hash of the eMule identifier. If the file is downloaded via BitTorrent service, the hash value is obtained by a hash function of the characteristic code and serial number of the torrent file.

If the corresponding hash value is found in the task database, it means that the requested file has been pre-downloaded and stored in the cloud storage. Then, the offline download sever informs the client computer that the requested file is ready for download. The hash value corresponding to the requested file is also included in the information. Thus, the client computer may download the file from the cloud storage by peer to server and peer (P2SP) technology according to the received hash value at high speed. On the contrary, if the hash value is not found in the task database, it means that the requested file has not been pre-downloaded, and the pre-download process of the requested file is arranged into a download schedule of the offline download server.

According to the above-described offline download method, the offline download server determines whether or not to start the pre-download process according to a search result of the hash value corresponding to the requested file in the task database. If the same hash value is found in the task database, the client computer can directly download the file already stored in the cloud storage. Otherwise, the offline download sever should pre-download the requested file from the designated file source.

Many similar files, corresponding to different hash values, may be requested by different clients. A movie may be stored as movie files with different formats and definitions, but with content that is substantially the same. The similar movie files (sometimes referred to as near-duplicate video files) are pre-downloaded in response to different offline download requests so that the bandwidth of the network and the space of the cloud storage is improperly and uneconomically used. For example, there are many movie files of "Transformers: Dark of the Moon", including formats of rmvb, mp4, mkv, 3gp, etc., stored in the QQDownload server and Thunder server (provided by two social networking companies in China). Also, the stored movie files can involve different video definitions. However, although many similar movie files have been pre-downloaded, the client cannot directly download any of the similar movie files if the hash values of the pre-downloaded files and the requested file do not match.

Since the space of the cloud storage is limited, it is impossible to store more and more pre-downloaded files without limitation, such that several files are removed at intervals to release space for new files. Usually, the least requested files are selected and deleted first, which may not be a good idea because it is more difficult and takes more time to pre-download the least requested files again due to few file sources. Also, after the deletion, when the file is requested again, it is possible that the file cannot be successfully pre-downloaded because of insufficient file sources.

Regardless of the difference in format, definition, codec type or audio volume, two video files that show similar video content are referred to as similar video files. Herein, "similarity value" is defined to show the similarity between two video files. If two video files are the same with regard to the video content, the similarity value between the two video files is 1. As described herein, under several conditions, two video files are considered as similar video files.

Video files having the same video content and different definitions are considered similar video files. For example, a video file of the English movie "Transformers" at 1380*720 definition and a video file of the English movie "Transformers" at 1034*576 definition are considered similar video files. Also, video files obtained by converting similar video files into different video types or versions for various media players (software) or platforms are considered similar video files. For example, files provided by cloud-based converters or converter software on personal computers are not changed in video content. In addition, video files with different formats obtained from encryption or compression of similar video files are considered similar video files. Sometimes, the encryption or compression related information is shown in the filenames. For example, DVDRip refers to a compressed copy of a final released DVD; DVDscr refers to a copy of release preview DVD with high quality through MPEG-4 compression which is available prior to the DVDrip version; HDRip (HD-DVD Rip) refers to a compressed copy of a high definition DVD with excellent quality. Furthermore, a video file of the English movie "Transformers" with rmvb format and a video file of the English movie "Transformers" with AVI format are considered similar video files. Also, the video file of the English movie "Transformers" with rmvb format according to the RV40 standard and a video file of the English movie "Transformers" with AVI format according to the H.364 standard are considered similar video files.

There are many near-duplicate video files modified in size, length, and/or compression and including/excluding borders, banners and logos on the internet. Hence, many reproduced video files corresponding to substantially the same video content are stored in the cloud storage of the offline download server. If the offline download system or method has to provide the client the video file corresponding to exactly the same hash value as requested, the other reproduced video files having substantially the same video content but unmatched hash values are left aside. The various versions of video files retained for possible future requests occupy more and more space of the cloud storage.

Figure 1:
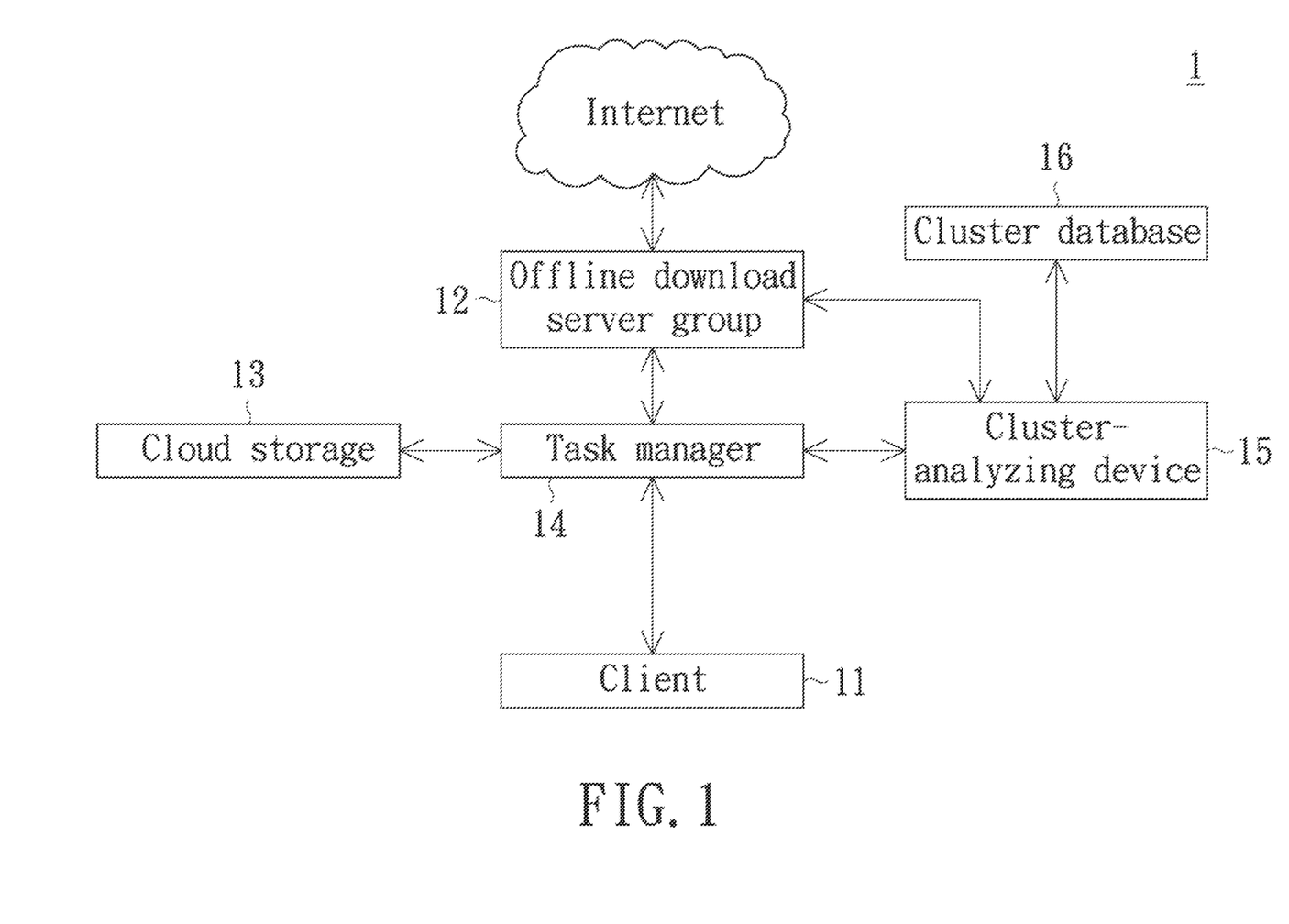
FIG. 1 is a schematic diagram illustrating an embodiment of an offline download system according to the present disclosure.

FIG. 1 is a schematic diagram illustrating an embodiment of an offline download system according to the present disclosure. The offline download system 1 includes a client 11, an offline download server group 12 having at least one offline download server, a cloud storage 13, a task manager 14, a cluster-analyzing device 15, and a cluster database 16 recording therein filenames and associated download links to the cloud storage 13. The task manager 14 receives an offline download request from the client 11, wherein the offline download request indicates the requested filename. The requested filename is extracted from the offline download request and sent to the cluster-analyzing device 15. Then, the cluster-analyzing device 15 searches the requested filename in the cluster database 16. If there is at least one similar filename recorded in the cluster database 16, the cluster-analyzing device 15 informs the task manager 14 of the similar filename(s) and the associated download link(s) to the cloud storage 13. The similar filename(s) and the associated download link(s) are further provided to the client 11 for choice. Thus, the client 11 may select one of the associated download link(s) and download the corresponding file similar to the requested file.

In the above-described offline download system, the task manager 14 does not manage one sever of the offline download server group 12 to start the pre-download process immediately after receiving the offline download request from the client 11. Instead, the requested filename is sent to the cluster-analyzing device 15 to check whether a similar file has been pre-downloaded and stored in the cloud storage 13. This step is performed by comparing the requested filename and the recorded filenames in the cluster database 16. If any similar filename is found, the information including the similar filename(s) and the associated download link(s) to the cloud storage 13 is sent to the client 11 through the task manager 14 so that the client 11 can decide whether or not to download one of the similar file(s) via the associated download link(s). Using this offline download system, the pre-download loading of the offline download server is expected to be reduced. The requested file, which is similar to the file stored in the cloud storage 13, is not pre-downloaded repetitiously, and the cloud storage 13 does not store numerous similar files any longer.

Figure 2A:
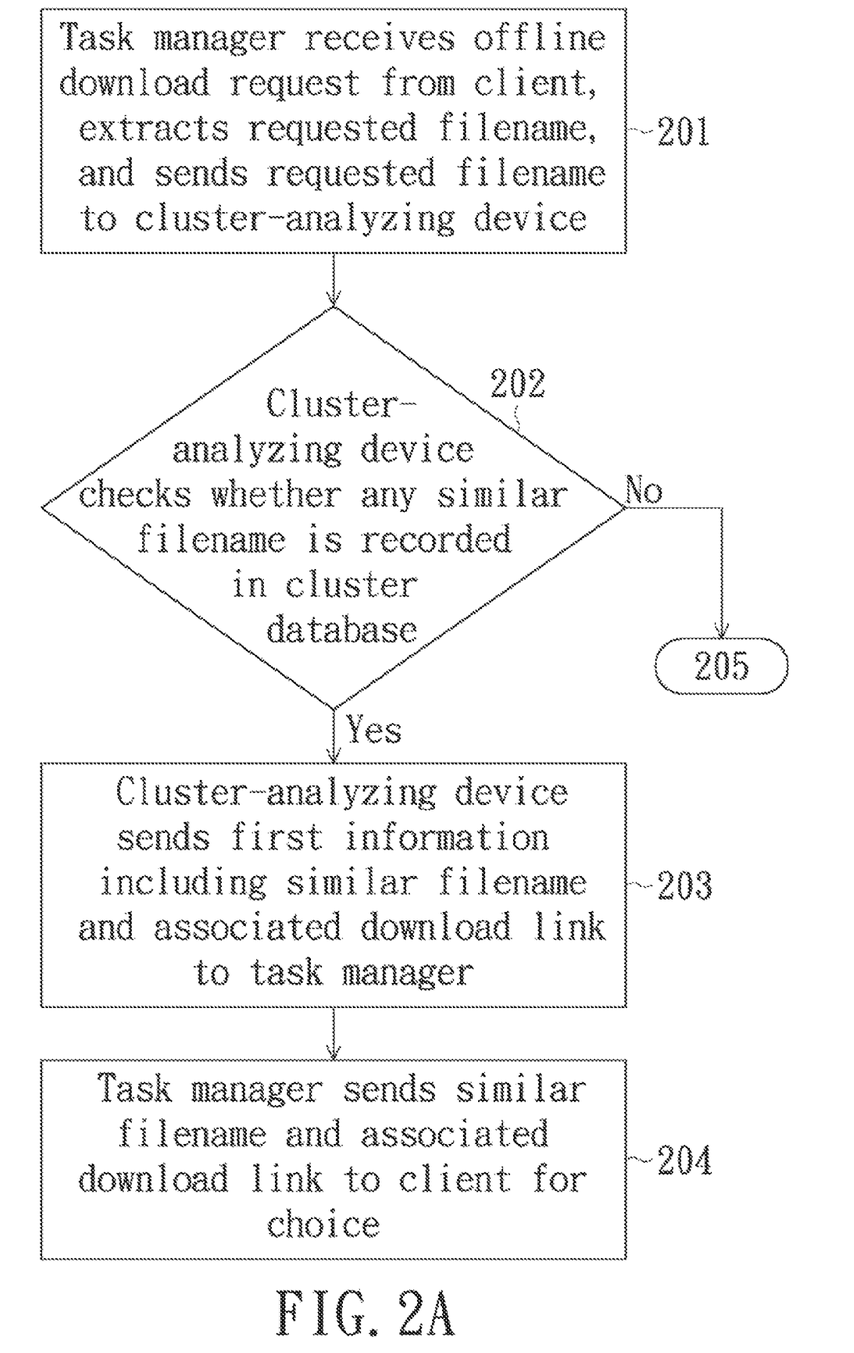
FIGS. 2A&B are flow diagrams showing steps of an offline download method according to the present disclosure.
Figure 2B:
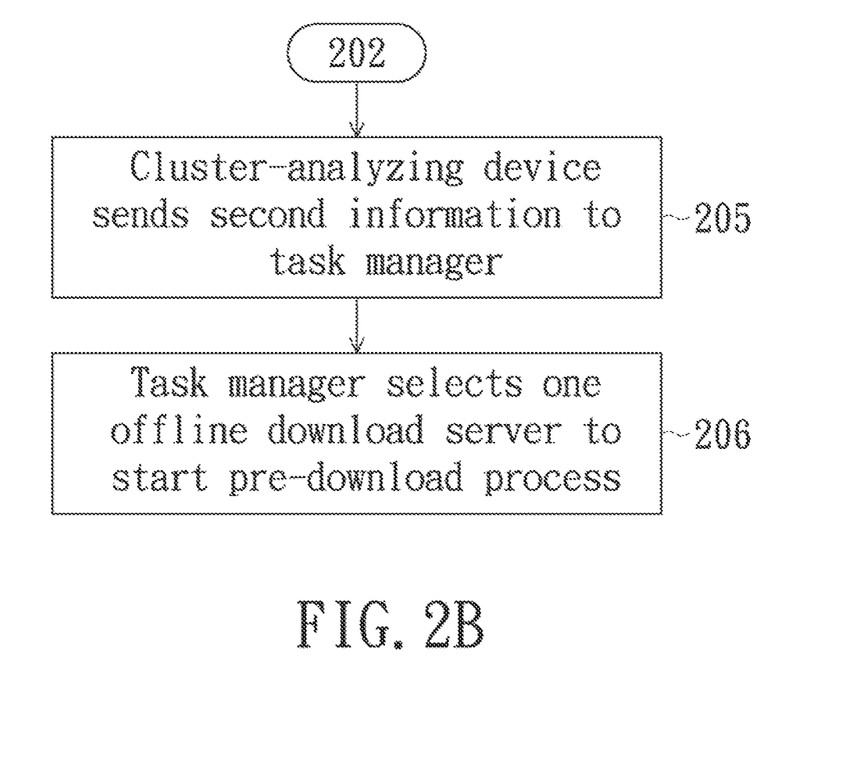

The offline download method performed by the offline download system of FIG. 1 is shown in the flow chart of FIGS. 2A&B. In step 201, the task manager 14 receives an offline download request from the client 11, and extracts the requested filename from the offline download request. The requested filename is sent to the cluster-analyzing device 15 for analysis. In step 202, the cluster-analyzing device 15 checks whether or not any similar filename is recorded in the cluster database 16. If any similar filename is found in the cluster database 16, the cluster-analyzing device 15 sends first information to the task manager 14. For example, the first information may include the similar filename(s) recorded in the cluster database 16 and the associated download link(s) to the cloud storage 13. In addition, the first information may include other properties of the searched similar file(s) which are useful for the client 11 to recognize the similar file(s). Optionally, the cluster-analyzing device 15 puts the requested filename into a cluster recording the similar filename(s) in the cluster database 16. In step 203, the task manager 14 sends the recorded similar filenames(s) and the associated download link(s) included in the first information to the client 11. The client 11 can select one of the associated download link(s) to download one of the similar file(s) from the cloud storage 13. If no similar filename is found in the cluster database 16, the cluster-analyzing device 15 sends second information to the task manager 14 in step 205. Then, a new cluster is created in the cluster database 16 and the requested filename is recorded in the new cluster by the cluster-analyzing device 15. Upon receiving the second information, the task manager 14 selects one offline download server among the offline download server group 12 according to a predefined load balancing principle to start the pre-download process for the requested file. The pre-downloaded file will be stored in the cloud storage 13, and the download link indicating the location where the pre-downloaded file is stored, is recorded in the cluster database 16 and associated with the requested filename. The download link will be provided to the client 11 after the pre-download process so that the client 11 can access the pre-downloaded file in the cloud storage 13 through the download link.

According to the offline download method, by analyzing the cluster of the requested filename prior to pre-downloading the requested file, the pre-downloading action of similar files is reduced and even exempted, which results in fewer similar files stored in the cloud storage 13. Under the best conditions, there is only one copy of the video file associated with a specific cluster stored in the cloud storage 13. In other words, for the specific cluster, no similar file is pre-downloaded, so that the loading of the offline download sever and the used space of the cloud storage 13 is significantly reduced.

Figure 3:
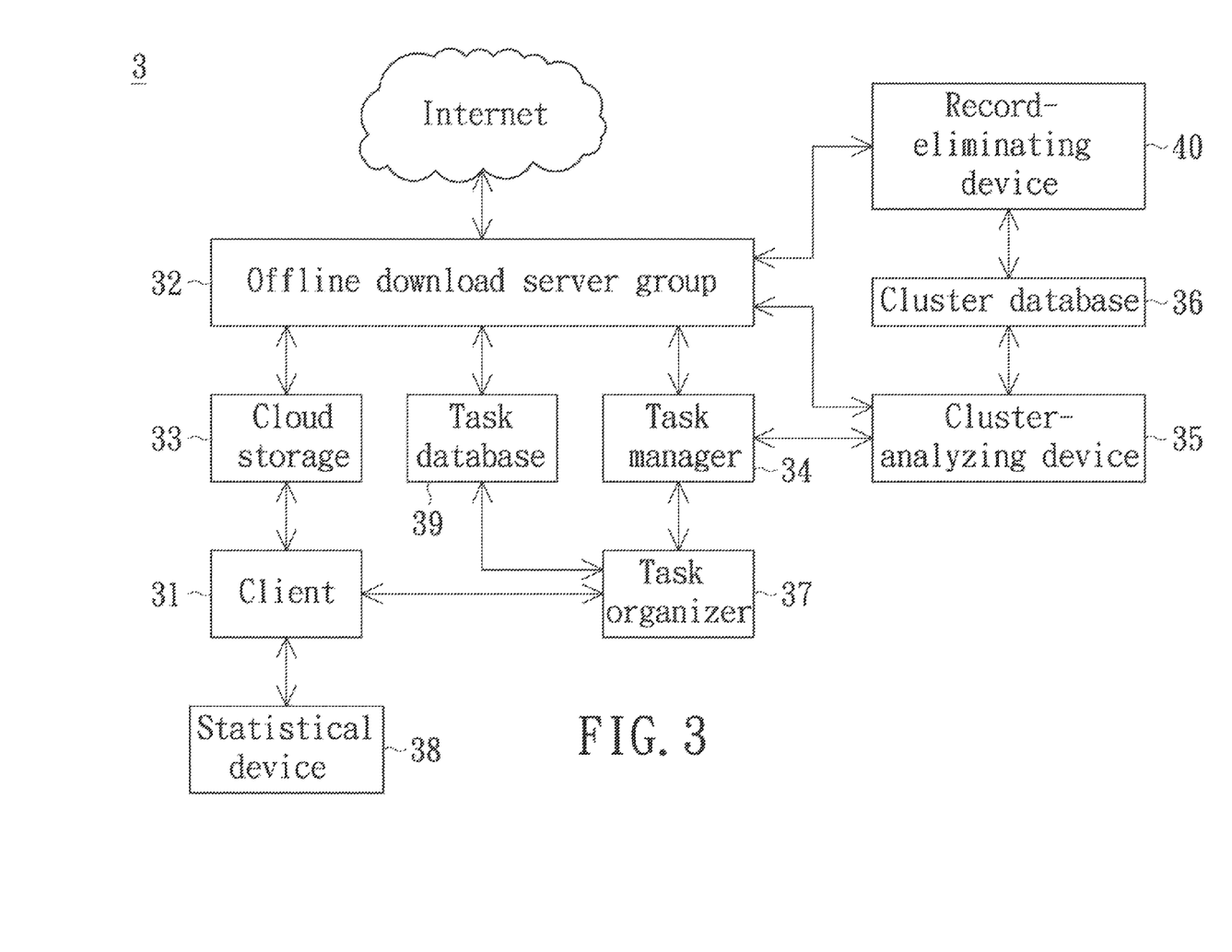
FIG. 3 is a schematic diagram illustrating an embodiment of an offline download system according to the present disclosure.

FIG. 3 is a schematic diagram illustrating one embodiment of an offline download system according to the present disclosure. Compared with offline download system 1, offline download system 3 further includes a task organizer 37, a statistical device 38, a task database 39 and a record-eliminating device 40. The function and communication of each element is described in detail in the following paragraphs.

Element-Client

The client 31 is in communication with the task organizer 37, the cloud storage 33, and the statistical device 38. It is to be noted that the client 31 hereinafter means any device which can send a request to another device, for example, a personal computer, a computer workstation or an electronic apparatus running a client software. In this embodiment, the client 31 sends an offline download request to the task organizer 37 wherein the offline download request may include an original file source, for example, a URL link, a HTTP request link, an eMule identifier, a torrent file, or a Magnet link indicating the requested file. In addition, the client 31 can login in a portal of the task organizer 37 to inquire about the pre-download progress of the requested file. After the pre-download process is completed and the requested file is stored in the cloud storage 33, the client 31 is allowed to download the requested file from the cloud storage 33 by peer to server and peer (P2SP) technology combining peer to peer (P2P) technology and peer to server (P2S) technology. The client 31 may know the completion of the pre-download process through notification sent by the task organizer 37 or by voluntarily inquiring about the pre-download progress through the task organizer 37. In an embodiment, the client 31 sends an error report to the statistical device 38 if any error is found in the received data segments involved in the downloaded file from the cloud storage 33. Optionally, the client 31 may send a download report including the download period, download speed, download result, file size, file category, original file source or other download information to the statistical device 38. As described above, the original file source is also included in the offline download request.

Element-Task Organizer

The task organizer 37 is in communication with the client 31, the task database 39 and the task manager 34. The task organizer 37 receives the offline download request from the client 31 and generates a unique serial number associated with the offline download request. The original file source is sent to the task database 39 and recorded. In addition, a recognition code corresponding to the requested file, for example, a hash value is also generated. Although the hash value is used in the embodiment for illustration, it is to be noted that other recognition codes are applicable for the present disclosure. If the offline download request includes a URL link, the hash value is obtained from a hash function of the URL link. If the offline download request includes an eMule identifier, the hash value may be a MD4 or MD5 hash of the eMule identifier. If the file is downloaded via BitTorrent service, the hash value is obtained by a hash function of the characteristic code and serial number of the torrent file.

If the hash value corresponding to the requested file has been recorded in the task database 39 and the associated status is labeled pre-download completion, it means that the requested file has been pre-downloaded and stored in the cloud storage 33. Then, the task organizer 37 informs the client 31 that the requested file is ready for download in the cloud storage 33. If the hash value corresponding to the requested file has been recorded in the task database 39 and the associated status is not labeled pre-download completion, it means that the pre-download process of the requested file is now in progress. The task organizer 37 will inform the client 31 after the completion of the pre-download process. If the hash value corresponding to the requested file is not recorded in the task database 39, it means that the requested file has not ever been pre-downloaded. Then, the hash value is recorded in the task database 39 and associated with the original file source, and the offline download request is sent to the task manager 34. During the pre-download process, the progress provided by the task manager 34 can be shown by the task organizer 37 to respond to the client's inquiry.

Element-Task Manager

The task manager 34 is in communication with the task organizer 37, the offline download sever group 32 and the cluster-analyzing device 35. The task manager 34 receives the loading condition of each offline download server periodically from the offline download sever group 32. In addition, the task manager 34 can filter out repeated offline download requests to make sure that the offline download server group 32 does not receive an offline download request more than once. In other words, when different clients make the same offline download request, only one offline download request is received by the offline download server group 32 and the different clients will receive the same pre-download progress while inquiring. In detail, the task manager 34 determines whether the current offline download request is identical to any previous offline download request. If yes, the information associated with the previous offline download request, e.g. the pre-download progress, is also sent to the current client, not only the previous client. Therefore, after the pre-download process of the requested file completes, each of the clients is informed and directed to download the same requested file from the cloud storage 33.

If it is the first time that the offline download request is received, the task manager 34 extracts the filename from the offline download request and sends the filename to the cluster-analyzing device 35. When the task manager 34 receives the first information (indicating that a similar file has been pre-downloaded before the offline download request) from the cluster-analyzing device 35, the task manager 34 does not send the offline download request to the offline download server group 32, but provides the similar filename(s) recorded in the cluster database 36 and the associated download link(s) included in the first information to the client 31. Thereafter, the client 31 selects one of the associated download link(s) to download one of the similar file(s), or substitute files, from the cloud storage 33. On the other hand, when the task manager 34 receives the second information (indicating that there is no similar filename recorded in the cluster database 36) from the cluster-analyzing device 35, the task manager 34 selects one offline download server among the offline download server group 32 according to the received loading report and a predefined load balancing principle to start the pre-download process for the requested file. In response, the selected offline download server starts to pre-download and store the requested file in the cloud storage 33. During the pre-download process, the task manager 34 receives the pre-download progress, pre-download speed and other pre-download information from the offline download server group 32 and synchronously updates the pre-download information in the task organizer 37.

Element-Cluster-Analyzing Device

The cluster-analyzing device 35 is in communication with the task manager 34, the offline download server group 32 and the cluster database 36. The cluster-analyzing device 35 receives the extracted filename from the task manager 34 and analyzes whether any filename recorded in the cluster database 36 is similar to the extracted filename.

The analyzing step is performed based on cluster analysis. At first, meaningless symbols and words in the extracted filename irrelevant to the file material are ignored. There is a simple naming rule in a filename, e.g. movie filename consisting of movie name+publisher+version+resolution+ video coding+audio coding+format or TV series filename consisting of series name+season number+episode number+ episode title+image source+video coding (default is MP3)+ audio coding+release group. Sometimes, the season number and episode number are not defined in Chinese TV series. It may be found that several referenced words or symbols irrelevant to the video material are inserted in some filenames. The words may include premiere, exclusive, hot, online, must, dubbing, TV, TV series and the like; the symbols may include [ ]( ) ( ) 【 】 &, etc. These irrelevant words or symbols can be deleted or dismissed. Afterwards, the extracted filename is cut into sections, each of which is a separate phrase. By cluster analysis based on the separate phrases, the extracted filename is classified into a target cluster. A cluster is a group of data objects, and the data objects in the same cluster are more similar to each other than to those in other clusters. The cluster-analyzing device 35 compares the target cluster and the clusters in the cluster database 36. If the target cluster is found in the cluster database 36, it means that at least one filename in the matched cluster is similar to the extracted filename. The cluster analysis determines the similarity between the phrases of the requested filename and the phrases of filenames in each cluster recorded in the cluster database 36. After the cluster analysis, the cluster including the similar filename, if any, can be found. Suitable clustering algorithms include but are not limited to partitioning method, hierarchical method, density-based method, grid-based method and model-based method. The filenames in one cluster are mapped to the cluster.

Also, the similarity between two filenames can be obtained by a cosine operation of the two filenames. For example, each of the two filenames are segmented and expressed by a vector: $\vec{Fa} = a_1x_1 + a_2x_2 + \ldots + a_nx_n$ and $\vec{Fb} = b_1x_1 + b_2x_2 + \ldots + b_nx_n$. The similarity value is defined as:

$$\cos\langle \vec{Fa}, \vec{Fb} \rangle = \frac{(a_1b_1 + a_2b_2 + \ldots + a_nb_n)}{\sqrt{a_1^2 + a_2^2 + \ldots + a_n^2} \sqrt{b_1^2 + b_2^2 + \ldots + b_n^2}}$$

Larger similarity value represents greater similarity between the two filenames.

If any similar filename is found in the cluster database 36, the cluster-analyzing device 35 sends the first information to the task manager 34 wherein the first information includes at least one similar filename and the associated download link. Which similar filename should be selected to be included in the first information is determined according to a predefined strategy. For example, the cluster-analyzing device 35 may randomly select several similar filenames in the designated cluster; select the similar filenames which are requested within a predetermined period, e.g. 10 minutes; or select several filenames corresponding to the latest requests in the designated cluster. Afterwards, the requested filename is also recorded in the designated cluster.

If no similar filename is found in the cluster database 36, the cluster-analyzing device 35 sends the second information to the task manager 34. Then, a new cluster is created in the cluster database 36 and the requested filename is recorded in the new cluster. After the pre-download process completes, the cluster-analyzing device 35 receives the download link indicating the location of the pre-downloaded file, and records the download link associated with the requested filename in the new cluster in the cluster database 36. The download link is provided to the client 31 after the pre-download process so that the client 31 can access the pre-download file in the cloud storage 33 through the download link.

Element-Cluster Database

The cluster database 36 is in communication with the cluster-analyzing device 35 and the record-eliminating device 40. The cluster database 36 records clusters of filenames. In addition, the cluster database 36 can provide filenames in the designated cluster and the associated download links in response to the inquiry from the cluster-analyzing device 35. Furthermore, the recorded cluster information is accessible to the record-eliminating device 40.

Element-Record Eliminating Device

The record-eliminating device 40 is in communication with the cluster database 36 and the offline download server group 32. The record-eliminating device 40 periodically accesses the cluster information and the associated download links from the cluster database 36. For similar files, it is assumed that only one file should be retained in the cloud storage 33 and the other files should be removed from the cloud storage 33 to release the space in the cloud storage 33. Thus, the download links recorded in the cluster database 36 and associated with the deleted files are marked to indicate that the download links for the deleted files should be directed to the download link for the retained file. Therefore, the download link included in the first information should be associated with the retained file rather than the deleted file.

Element-Offline Download Server Group

The offline download server group 32 is in communication with the record-eliminating device 40, the cloud storage 33, the task database 39, the task manager 34 and the cluster-analyzing device 35. The offline download server group 32 includes at least one offline download server. It periodically reports the loading condition and the available space of each offline download server to the task manager 34 so that the task manager 34 can designate a proper offline download server for each pre-download process according to the report. In response to the command from the task manager 34, the designated offline download server continuously pre-downloads the requested file, and the offline download server group 32 regularly sends the pre-download progress, pre-download speed and other pre-download information to the task manager 34. After the pre-download process completes, the pre-downloaded file is stored in the cloud storage 33 to be downloaded by the client 31 later. In the task database 39, the associated status of the recognition code such as the hash value corresponding to the pre-downloaded file is marked pre-download completion in response to the notice from the offline download server group 32. The associated download link to the cloud storage is sent to the cluster-analyzing device 35.

Element-Statistical Device

The statistical device 38 is in communication with the client 31. The statistical device 38 receives the error report from the client 31 when any error is found in the received data segments involved in the downloaded file from the cloud storage 33. The statistical device 38 further receives feedback from the client 31 such as the download reports including the download period, download speed, download result, file size, file category, original file source or other download information. Basically the statistical device 38 generates log files according to the download reports for further statistical analysis.

Element-Cloud Storage

The cloud storage 33 is in communication with the client 31 and the offline download server group 32. The cloud storage 33 mainly stores the pre-downloaded files from the offline download server group 32. The client 31 can download the files from the cloud storage 33 at high speed because bandwidth is reserved for the client 31.

The function and communication of each element of the offline download system as shown in FIG. 3 has been described in detail. According to the present disclosure, the task manager 34 does not command the offline download sever group 32 to start a pre-download process immediately after receiving an offline download request. Instead, the task manager 34 extracts the filename from the offline download request and sends the requested filename to the cluster-analyzing device 35. The cluster-analyzing device 35 checks whether any similar filename has been recorded in the cluster database 36. If yes, the cluster-analyzing device 35 sends the first information to the task manager 34 wherein the first information includes the similar filename(s) and the associated download link(s) to the cloud storage 33. Then, the task manager 34 provides the similar filename(s) and the associated download link(s) to the client 31, so that the client 31 may select one of the associated download links to download a similar file or a substitute file from the cloud storage 33. Hence, the loading of the offline download server group 32 together with the bandwidth is significantly reduced because the pre-download processes of similar files have been basically avoided. Another advantage is that the cloud storage 33 does not store large numbers of similar files with the same content any more, resulting in optimization of storage space. Moreover, if the suggested similar file is acceptable to the client 31, the client 31 can download a ready file from the cloud storage 33 without waiting long for the pre-download process of exactly the requested file. The proposed offline download method and system achieve higher efficiency.

In the above-described embodiments, the similar files are determined according to the filenames. For video files, the similar files can be determined according to the video content of the video files, and a relative offline download method is described as follows.

Figure 4:
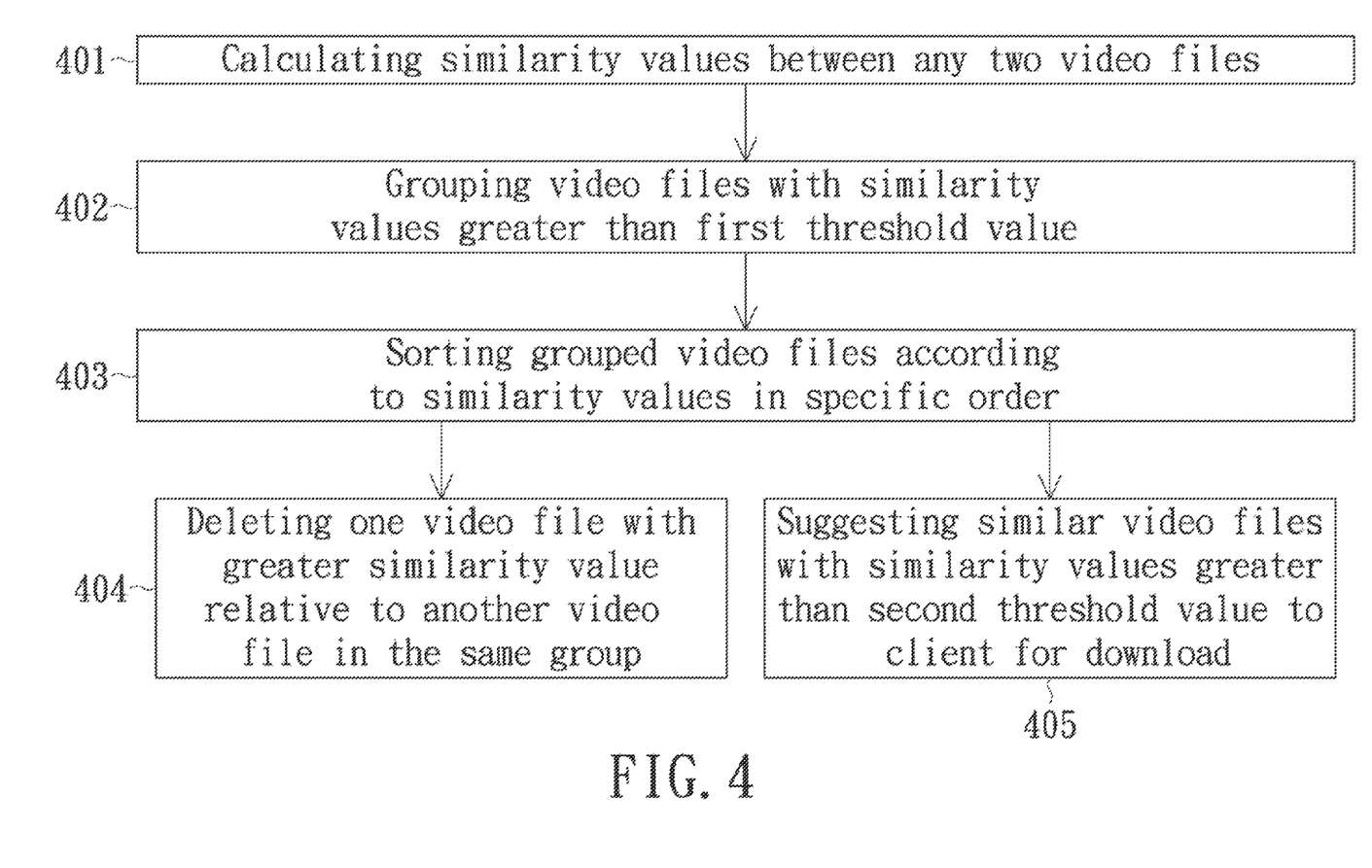
FIG. 4 is a flow diagram showing steps of a matching-relative portion of the offline download method according to the present disclosure.

FIG. 4 is a flow diagram showing steps of a matching-relative portion of the offline download method according to the present disclosure. In step 401, the similarity value between two video files is calculated based on video matching. Since the video content of video files is too complicated to analyze or classify, it is necessary to find the representative characteristic of the video files for analysis. For a video file, the video content consists of video frames. At least one video frame may be extracted from the video file and considered as the representative characteristic to be analyzed. Video content consists of many scenes which include many video frames. Each scene may be characterized by a few video frames. Thus, the video frames are selected to represent the scene. In principle, similar video files should have the same representative video frames. Therefore, the essential issue is how to select the representative video frames.

This example illustrates the steps of calculating the similarity value between two video files A and B. At first, a video frame at time point A is extracted from a scene A of the video file A and decoded by a compliant video decoder to generate a representative decoded frame A'. Then, video frames during a period (e.g. from time point A−d to time point A+d; d is about 1 minute), are extracted from a scene B of the video file B and decoded to generate several decoded frames B1~Bn. If the representative decoded frame A' matches one of the decoded frames B1~Bn, it is assumed that the two scenes A and B are similar. Then, another video frame at a different time point is further extracted from the video file A and the comparison step is repeated. If the video files A and B have more similar scenes than video files A and C, the similarity value between the video files A and B is greater than that between the video files A and C. When two video files are the same, the similarity value is defined as 1.

A hash algorithm may be used to index the representative frames and compute the frame match sequence between the two video files. Then, a random sample consensus (RANSAC) method is used to fit the frame match sequence to obtain the matching values of the frame match sequence between the two video files. Then, the similarity value between the two video files is calculated according to the matching values.

The feature of the scene can be represented by the change on average brightness between video frames. When the current scene is switched to the next scene, it is believed that the average brightness will change. Therefore, after determining the sampling period, we can calculate the average brightness of each video frame during the sampling period and obtain an average brightness curve. Thus, the similarity value between the two video files can be calculated by comparing the average brightness curves of the two video files.

Furthermore, since the video frames may be affected by noise signals, the noise-affected video frames or the influence should be removed to get the valid match sequence before calculating the similarity value. By taking advantage of the de-noise step, the precision of the calculated similarity value increases. A Gaussian filter or other proper filter can be applied to the average brightness curve to remove the meaningless extreme values and smooth the average brightness curve. Therefore, the similarity value of two video files can be calculated by comparing two smoothed average brightness curves derived from the two video files.

If the video file to be compared has been modified or edited by the publisher to change the frame rate, e.g. fast forward or slow motion effect, or the two video files have different frame rates, a frame rate-adjusting preprocess is required to synchronize the two video files before calculating the similarity value between the two video files. Otherwise, the calculation based on the asynchronous frames will affect the precision of the similarity value.

The video files to be compared are downloaded from the cloud storage of the offline download system and the similarity values therebetween are calculated by a similarity-calculating device. Since the filename can be extracted from the offline download request, to calculate the similarity values between the requested video file and other video files downloaded from the cloud storage, it is suggested to select the video file having a filename similar to the requested video file as the first priority to be compared.

After the calculation of the similarity values, the video files are classified into groups according to the similarity values. In step 402, if the similarity value between any two video files is greater than a first threshold value, it means that the two video files are considered as similar video files and they are grouped together. The video files are grouped together by recording the recognition codes such as hash values of the two video files in the same archive in a video matching database. Similar video files are mapped to the hash values recorded in the same archive. The similarity values are also recorded in the video matching database.

In step 403, the grouped video files are sorted by sorting the recognition codes according to the similarity values in descending order or ascending order. From the sorted records, the similarity between video files can be easily judged.

In order to release a certain space of the cloud storage for new files, the cloud storage is regularly cleaned up to remove out-of-date files. Deleting the near-duplicated files, but not hard-to-get files, can increase the overall efficiency of the offline download system. In step 404, for the video files corresponding to the hash values recorded in a specific archive, one video file with a higher similarity value relative to another video file can be deleted first. Therefore, if the hash values in the archive are sorted according to the similarity values in descending order, the video file mapped to the hash value arranged at the head can be deleted first. For example, relative to a specific video file, the similarity values of the first, the second and the third video files are 0.8, 0.7 and 1, respectively. The three hash values corresponding to the three video files are recorded in the same archive and rearranged in order of the third, the first and the second hash values. Therefore, the third video file mapped to the third hash value is selected and deleted first, if necessary. The next choice is the first video file, and the last choice is the second video file. It is to be noted that the sequence is not absolute. In some embodiments, the acceptable similarity value may be predefined, and the video files with greater similarity values than the acceptable similarity value are randomly selected for deletion. Although the video files are removed from the cloud storage, the hash values and associated similarity values are still recorded in the video matching database.

In step 405, when the requested file is not found in the cloud storage, the task manager may check the video matching database to determine whether the requested file has ever been pre-downloaded but deleted later. If yes, the task manager can find the recognition code such as hash value corresponding to the requested file in the video matching database. Thus, the similar video files mapped to the hash values recorded in the same archive may be suggested as substitute video files to the client. In a preferred embodiment, only the video files with greater similarity values relative to the requested file than a second threshold value are shown in the recommended list. The suggested video files are highly similar to the requested file based on the similarity values. Since the corresponding hash values are recorded in the same archive, the second threshold value is greater than or equal to the first threshold value. Then, the client can select one of the suggested video files and download it from the cloud storage at high speed without waiting another for a pre-download process of the requested file. By this method, the loading of the offline download server group is significantly reduced because the pre-download processes of similar files have been basically avoided. In addition, it is not necessary for the cloud storage to store large numbers of similar video files or near-duplicate video files. Moreover, the client can download a ready file from the cloud storage without waiting for the pre-download process of exactly the requested file and efficiency is significantly raised.

It is to be noted that the steps 404 and 405 are independent of each other. That is, the execution sequence of steps 404 and 405 is not limited by the above-described embodiments. Even synchronous execution of these steps is allowed.

Figure 5:
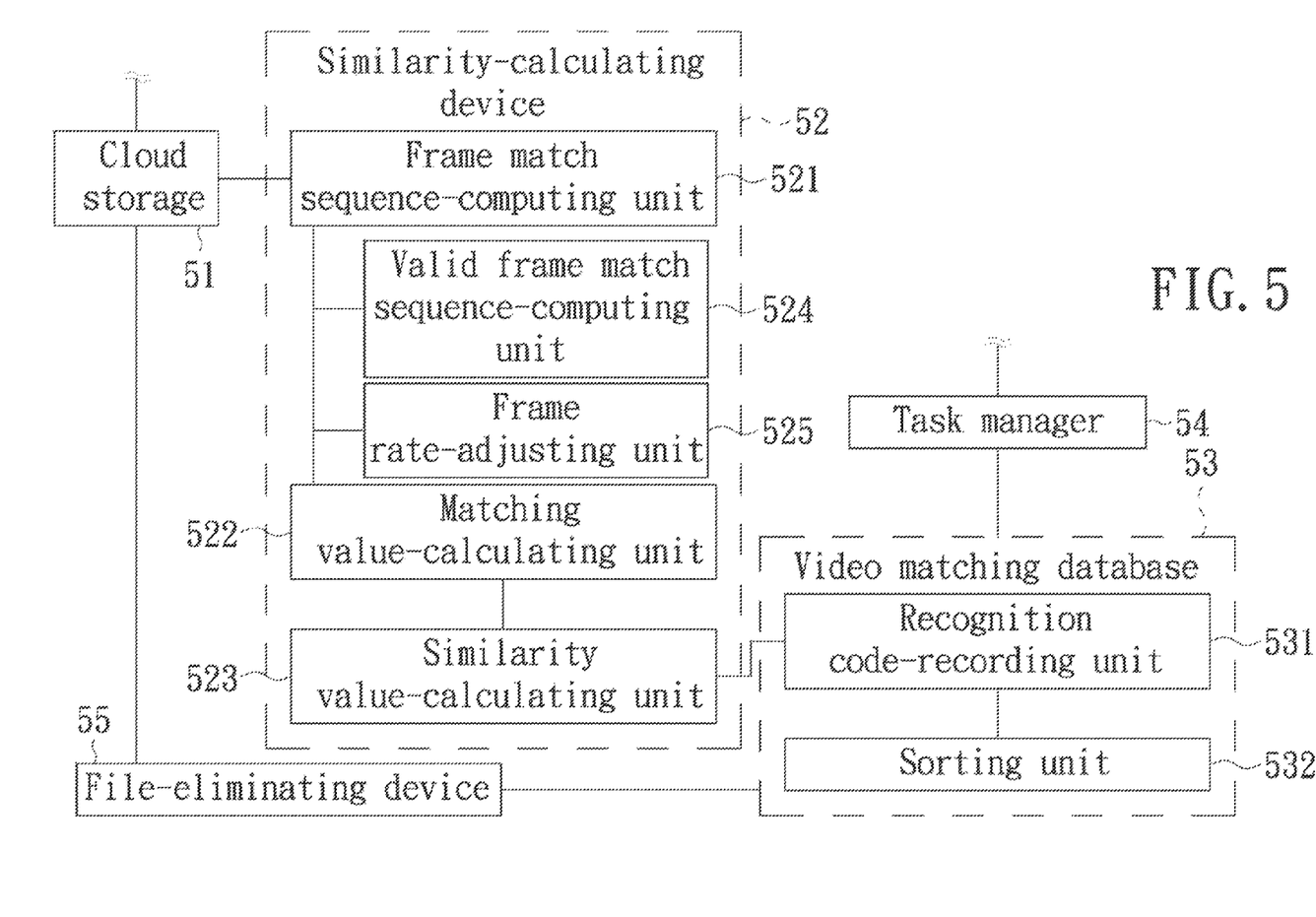
FIG. 5 is a schematic diagram illustrating a matching-relative portion of the offline download system according to the present disclosure.

FIG. 5 is a schematic diagram illustrating a matching-relative portion of the offline download system for performing the above-described offline download method. The offline download system includes, but is not limited to, the cloud storage 51, the similarity-calculating device 52, the video matching database 53, the task manager 54, and a file-eliminating device 55.

The similarity-calculating device 52 is in communication with the cloud storage 51 and the video matching database 53. The similarity-calculating device 52 continuously downloads video files to be compared from the cloud storage 51, and calculates similarity values between any two video files. The similarity-calculating device 52 further includes a frame match sequence-computing unit 521, a matching value-calculating unit 522 and a similarity value-calculating unit 523. The frame match sequence-computing unit 521 uses a hash algorithm to index the representative frames and compute the frame match sequence between the two video files. The matching value-calculating unit 522 uses random sample consensus (RANSAC) method to fit the frame match sequence to obtain the matching values of the frame match sequence between the two video files. The similarity value-calculating unit 523 calculates the similarity value according to the matching values.

Optionally, the similarity-calculating device 52 further includes a valid frame match sequence-computing unit 524 for removing the noise-affected frames of the video files to obtain the valid frame match sequence between the two video files. Further, the similarity-calculating device 52 can include a frame rate-adjusting unit 525 for adjusting frame rate of the video frames to synchronize the two video files.

The video matching database 53 groups the video files with similarity values greater than the first threshold value, and records the recognition codes such as hash values of the grouped video files in the same archive. The recognition codes recorded in the same archive are sorted according to the similarity values between video files. The above-mentioned actions are performed by a recognition code-recording unit 531 and a sorting unit 532 included in the video matching database 53, respectively.

When the requested file is not found in the cloud storage 51, the task manager 54 searches the recognition code corresponding to the requested file in the video matching database 53. If the recognition code is found, it means that the requested file has been removed from the cloud storage 51. The task manager 54 provides a recommended list showing the similar video files mapped to the recognition codes recorded in the same archive to the client. In some embodiments, only the video files with greater similarity values relative to the requested file than the second threshold are shown in the recommended list because these video files are highly similar to the requested file. The second threshold value is greater than or equal to the first threshold value. Then, the client can select one of the suggested video files and download it from the cloud storage 51 at high speed without waiting for another pre-download process of the requested file.

The file-eliminating device 55 is used for deleting near-duplicate video files in the cloud storage 51. The video files to be deleted are determined according to the sorted recognition codes recorded in the archive. If the recognition codes are sorted according to the similarity values in descending order, the video file mapped to the recognition code arranged at the head of the archive is deleted first. In an alternative embodiment, the acceptable similarity value may be predefined, and the video files with greater similarity values than the acceptable similarity value are randomly selected for deletion.

It is to be noted in the above-described embodiments, all units, elements and devices are described and denominated based on their functionality. Other units, elements or devices capable of performing at least one of the steps described above are included in the modifications of the embodiments and encompassed in the disclosure. In addition, the steps of the methods according to the present disclosure can be implemented by hardware and/or software. The scope of the present disclosure is not limited thereto.

All or part of the steps in the various embodiments described above are provided by a processor that executes computer readable instructions stored in a memory, where the memory includes non-transitory computer readable storage media, such as random access memory (RAM), different types of read only memory (ROM), and disk storage including optical disk storage.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An offline download method adapted to be used with an offline download system comprising a cloud storage storing pre-downloaded files, the offline download method comprising steps of:
   receiving an offline download request for a requested file from a client,
   selecting at least one substitute file from the pre-downloaded files stored in the cloud storage when the requested file is not found m the cloud storage, wherein the at least one substitute file is determined to be similar to the requested file according to a similarity between the at least one substitute file and the requested file,
   sending first information comprising at least one filename of the at least one substitute file and at least one associated download link to the cloud storage, and
   the client downloading one of the at least one substitute file from the cloud storage by connecting to the at least one associated download link.

2. The offline download method according to claim 1, wherein the requested file and the pre-downloaded files are video files and the offline download method further comprises steps of:
   calculating similarity values between any two video files stored in the cloud storage;
   grouping video files with the similarity values greater than a first threshold value; and
   sorting the grouped video files according to the similarity values in descending order.

3. The offline download method according to claim 2, wherein the video files are grouped by recording recognition codes corresponding to the video files in the same archive in a database, the recognition codes being hash values mapped with the video files and sorted according to the similarity values in descending order.

4. The offline download method according to claim 3, further comprising steps of:
   selecting one video file mapped to the recognition code at the head of the archive;
   deleting the selected video file in the cloud storage to release space of the cloud storage; and
   retaining the recognition code corresponding to the deleted video file in the archive.

5. The offline download method according to claim 2, wherein the similarity value between the at least one substitute file and the requested file is greater than a second threshold value, the second threshold value being greater than the first threshold value.

6. The offline download method according to claim 2, wherein the calculating step further comprises steps of:
   using a hash algorithm to index representative frames and computing frame match sequence between the two video files;
   using random sample consensus (RANSAC) method to fit the frame match sequence to obtain matching values of the frame match sequence between the two video files; and
   calculating the similarity value between the two video files according to the matching values.

7. The offline download method according to claim 6, wherein before the similarity value is calculated, the offline download method further comprises a step of adjusting a frame rate of at least one of the two video files to synchronize the two video files.

8. The offline download method according to claim 1, wherein after the step of receiving the offline download request, the offline download method further comprising steps of:
   extracting a filename of the requested file from the offline download request; and
   searching the extracted filename in a database recording a plurality of filenames of the pre-downloaded files to find at least one filename corresponding to the at least one substitute file.

9. The offline download method according to claim 8, further comprising steps of:
   dismissing words and symbols in the extracted filename, the words and symbols being irrelevant to contents of the requested file;
   cutting the extracted filename into sections, each of which is a separate phrase;
   classifying the designated filename into a target cluster by analyzing the separate phrases;
   searching the target cluster in the database; and
   determining filenames in the target cluster as the at least one filename corresponding to the at least one substitute file when the target cluster is found in the database.

10. The offline download method according to claim 9, further comprising steps of:
    starting a pre-download process of the requested file when the target cluster is not found in the database and storing the pre-downloaded requested file in the cloud storage;
    creating the target cluster in the database;
    recording the extracted filename and an associated download link to the cloud storage in the target cluster in the database; and
    the client downloading the requested file from the cloud storage by connecting the associated download link after the pre-download process of the requested file completes.

11. An offline download system adapted to be used for pre-downloading a requested video file from internet in response to an offline download request from a client, the offline download system comprising:
    a cloud storage storing a plurality of video files;
    a similarity-calculating device implemented by one or more processors that calculates similarity values between any two video files stored in the cloud storage;
    a video matching database grouping video files with the similarity values greater than a first threshold value and sorting the grouped video files according to the similarity values in descending order; and
    a task manager implemented by the one or more processors in communication with the client, wherein the task manager receives the offline download request for the requested video file from the client, and sends first information to the client when the requested video file is not found in the cloud storage, wherein the first information comprises at least one filename corresponding to at least one substitute file selected from the video files stored in the cloud storage, and wherein the client selects one of the at least one substitute file to download, the at least one substitute file being determined to be similar to the requested video file according to a similarity value between the at least one substitute file and the requested video file.

12. The offline download system according to claim 11, wherein the video files are grouped by recording recognition codes corresponding to the video files in the same archive in the video matching database, the recognition codes being hash values mapped with the grouped video files and sorted according to the similarity values in descending order.

13. The offline download system according to claim 12, further comprising a file-eliminating device implemented by the one or more processors that deletes one video file in the cloud storage wherein the deleted video file is mapped to the recognition code at the head of the archive.

14. The offline download system according to claim 11, wherein the similarity-calculating device comprises:
 a frame match sequence-computing unit using a hash algorithm to index representative frames and computing frame match sequence between the two video files;
 a matching value-calculating unit using a random sample consensus (RANSAC) method to fit the frame match sequence to obtain matching values of the frame match sequence between the two video files; and
 a similarity value-calculating unit calculating the similarity value between the two video files according to the matching values;
 wherein the frame match sequence-computing unit, the matching value-calculating unit, and the similarity value-calculating unit are implemented by logic.

15. The offline download system according to claim 14, wherein the similarity-calculating device further comprises a valid frame match sequence-computing unit removing noise-affected frames of the video files to obtain valid frame match sequence between the two video files, wherein the sequence-computing unit is implemented by logic.

16. The offline download system according to claim 11, wherein the video matching database comprises:
 a recognition code-recording unit grouping the video files with the similarity values greater than the first threshold value; and
 a sorting unit sorting the grouped video files according to the similarity values in descending order;
 wherein the recognition code-recording unit and the sorting unit are implemented by logic.

17. An offline download system adapted to be used for pre-downloading a requested file from internet in response to an offline download request from a client, the offline download system comprising:
 a cloud storage storing a plurality of video files;
 a task manager implemented by one or more processors in communication with the client wherein the task manager receives the offline download request from the client, extracts a filename of the requested file from the offline download request, and sends first information to the client when the requested file is not found in the cloud storage, and wherein the first information comprises at least one filename corresponding to at least one substitute file and at least one associated download link to the cloud storage;
 a cluster database recording a plurality of filenames of the video files stored in the cloud storage; and
 a cluster-analyzing device implemented by the one or more processors in communication with the task manager and the cluster database for receiving the extracted filename and searching the extracted filename in the cluster database, the cluster-analyzing device sending the first information to the task manager when the extracted filename is not found in the cluster database.

18. The offline download system according to claim 17, wherein the cluster-analyzing device dismisses words and symbols in the extracted filename, the words and symbols being irrelevant to contents of the requested file; cuts the extracted filename into sections, each of which is a separate phrase; classifies the extracted filename into a target cluster by analyzing the separate phrases; and determines filenames in the target cluster as the at least one filename corresponding to the at least one substitute file when the target cluster is found in the cluster database.

19. The offline download system according to claim 17, wherein the cluster-analyzing device sends second information to the task manager to start a pre-download process of the requested file when the target cluster is not found in the cluster database; creates the target cluster in the cluster database; and records the extracted filename and an associated download link to the cloud storage in the target cluster in the cluster database.

20. The offline download system according to claim 19, further comprising an offline download server group including at least one offline download server wherein the task manager selects one offline download server among the offline download server group to pre-download the requested file in the internet after receiving the second information, and stores the requested file in the cloud storage.

* * * * *